United States Patent
Rathmann-Ramlow et al.

(10) Patent No.: US 8,480,127 B2
(45) Date of Patent: Jul. 9, 2013

(54) RESTRAINT SYSTEM WITH ADJUSTABLE AIRBAG

(75) Inventors: Thomas Rathmann-Ramlow, Esne (DE); Ulf Grüne, Esne (DE)

(73) Assignee: Schroth Safety Products GmbH, Arnsberg (DE)

( * ) Notice: Subject to any disclaimer, the term of this patent is extended or adjusted under 35 U.S.C. 154(b) by 28 days.

(21) Appl. No.: 13/032,891

(22) Filed: Feb. 23, 2011

(65) Prior Publication Data

US 2011/0204606 A1    Aug. 25, 2011

Related U.S. Application Data

(60) Provisional application No. 61/307,595, filed on Feb. 24, 2010.

(51) Int. Cl.
*B60R 21/18* (2006.01)
(52) U.S. Cl.
USPC .......................................................... 280/733
(58) Field of Classification Search
USPC ............................................. 280/733, 801.1
See application file for complete search history.

(56) References Cited

U.S. PATENT DOCUMENTS

| 3,948,541 | A | 4/1976 | Schulman |
| 4,348,037 | A | 9/1982 | Law et al. |
| 4,741,574 | A | 5/1988 | Weightman et al. |
| 5,062,662 | A | 11/1991 | Cameron |
| 5,288,104 | A | 2/1994 | Chen |
| 5,794,971 | A | 8/1998 | Boydston et al. |
| 6,746,041 | B2 * | 6/2004 | Chang et al. ............ 280/730.1 |
| 7,322,603 | B2 * | 1/2008 | Gray et al. ................. 280/733 |

FOREIGN PATENT DOCUMENTS

| DE | 38 20 145 C 2 | 1/1990 |
| DE | 94 18 721 U 1 | 5/1996 |
| DE | 699 19 722 T2 | 9/2005 |

OTHER PUBLICATIONS

German Search Report dated Sep. 14, 2010 for the priority German application.

* cited by examiner

*Primary Examiner* — Faye M. Fleming
(74) *Attorney, Agent, or Firm* — Kane Kessler, P.C.; Paul E. Szabo, Esq.

(57) ABSTRACT

A restraint system for occupants of a vehicle, comprising a belt; an airbag unit arranged on the belt, wherein the positions of the belt and the airbag unit can be shifted with respect to each other; an airbag in the airbag unit; and means for securing the position of the airbag on the belt, i.e., means by which the airbag and the belt can be fastened together upon deployment of the airbag without the possibility of a shift in their relative positions.

17 Claims, 3 Drawing Sheets

RESTRAINT SYSTEM WITH ADJUSTABLE AIRBAG

RELATED APPLICATIONS

This application claims the benefit of U.S. Provisional Application No. 61/307,595, filed Feb. 24, 1010, the entire disclosure of which is incorporated by reference.

BACKGROUND OF THE INVENTION

The present invention pertains generally to a restraint system with an adjustable airbag.

The following discussion pertaining to the implementation of the invention is intended to assist the reader in understanding the advantages of the invention and is not to be interpreted as presenting the state of the art for this invention.

To ensure the safety of passengers in land vehicles, aircraft, and watercraft, restraint systems suitable to each case are installed. A combination of a safety belt and an airbag is used to minimize the consequences of an accident. Whereas the safety belt holds the vehicle occupant securely in his seat, the inflated airbag cushions his impact against parts of the vehicle. These devices in their totality significantly decrease the forces of deceleration which act on the vehicle occupants when an accident occurs. The injuries which might result from an accident are therefore reduced or possibly even prevented entirely.

Whereas the safety belt reduces the acceleration of the torso during a collision of the vehicle, the extremities and especially the head are still subject to initial acceleration and deflection. To reduce the deflection of the head and to cushion its impact in closed vehicles, head airbags are used, which are installed in the area of the door, the pillar, or the roof. So that the airbag, when in its original position, will be as close as possible to the body areas of the occupants to be protected, systems are already known which mount the airbag on the safety belt.

U.S. Pat. No. 5,288,104 discloses to this end a cushioning safety device for use in a vehicle, which is suitable for mounting on a safety belt. For this purpose, a tube-like container is provided with hook portions at its ends, by which it can be fastened to a safety belt in the area of the occupant's chest. The container contains a folded airbag, which can be expanded through a valve in the container. An elastic tube connects the airbag to an inflation unit installed in the vehicle. The inflation unit contains not only an accident detection sensor but also a gas generator, which inflates the airbag through the elastic tube.

The safety device created in this way can be installed as standard solution in any vehicle with an integrated safety belt, either at the factory or as a retrofit. Because the elongated container is connected to the safety belt via the hook portions, the container can be shifted lengthwise along the belt and its position thus adapted to the vehicle occupant in question. The proposed ability to shift the position of the airbag increases comfort and the adaptability to individual circumstances.

Nevertheless, the possibility of being able to shift the position of the airbag can lead during an accident to an uncontrolled displacement of the airbag as it is being deployed, which can have devastating results for the vehicle's occupants under certain conditions. Against this background, it can be seen that the proposed design offers room for safety-relevant improvements.

It would thus be desirable and advantageous to make available an improved restraint system with an airbag mounted relocatably on a belt, namely, a restraint system which avoids the shortcomings of the state of the art and which, during an accident, makes it possible for the airbag to remain in its proper position as it is being deployed.

According to one aspect of the invention, a restraint system for an occupant of a vehicle comprises a belt; an airbag unit arranged on the belt, wherein the positions of the belt and the airbag unit can be shifted with respect to each other; an airbag in the airbag unit; and means by which the airbag can be secured on the belt, i.e., means by which the airbag and the belt can be fastened together upon deployment of the airbag without the possibility of a shift in their relative positions.

The present invention solves the problems arising from the state of the art by providing the position-securing means. These means make it possible to connect the airbag and/or the airbag unit to the belt so that they cannot shift their positions. Thus, under normal conditions, the airbag unit and the belt can be easily relocated with respect to each other, so that the device can be adapted individually to the occupant in question. At the same time, it is guaranteed that the airbag, when deployed, will be held securely in its position on the belt.

Overall, a restraint system for the occupants of land vehicles, watercraft, or aircraft is created which can be adapted individually to any circumstances and requirements and which offers not only flexibility and comfort but also a maximum of safety.

According to another advantageous feature of the present invention, the position-securing means are surrounded by a cover. In addition to protecting the position-securing means from, for example, undesirable mechanical effects or dirt, which could impair the functioning of the device or even destroy it, it is ensured in this way that the position-securing means remain inactive until the cover is removed.

According to another advantageous feature of the present invention, the cover is attached to the airbag unit and can be moved out of the way by the deploying airbag. The attachment of the cover to the airbag unit in combination with the movement of the airbag as it is being deployed means that no additional actuators are necessary to move the cover out of the way. The deploying airbag itself therefore serves as the direct actuator which removes the cover, as a result of which the position-securing means are activated.

According to another advantageous feature of the present invention, the position-securing means are designed advantageously according to the principle of a hook-and-loop fastening. For this purpose, a first part of the hook-and-loop fastening is provided on the belt, whereas a second part of the hook-and-loop fastening is provided on the airbag unit, so that it can enter into a hook-and-loop connection with the first part.

The advantages of a hook-and-loop fastening are to be found in its high resistance to aging and deformation. Such fastenings are also low in weight and can be processed easily together with the fabrics and textiles predominantly used in these types of restraint systems. Their functionality is ensured even after becoming wet and, depending on how they are made, even at high temperatures.

When certain requirements are to be met, however, it is also possible in principle to use other types of positive, nonpositive, or bonded fastenings which meet the requirement of secure fixation. For example, adhesive surfaces or anti-slip surface structures which are provided on the belt and/or on the airbag unit are also conceivable.

According to another advantageous feature of the present invention, the undeployed airbag in the folded state is at least partially surrounded by the cover. The cover thus wraps completely or at least partially around the folded airbag, wherein the cover is arranged in a U-like fashion around the folded airbag.

As a result, the cover is pushed out of its original position by the airbag as it expands during its deployment. Because the cover is attached to the airbag unit, a specific area of the cover not connected to the airbag unit is pulled very quickly out of its original position and thus moved out of the way of the position-securing means, as a result of which they are activated. For this purpose the cover preferably has a flat and readily flexible structure.

Not only metal or plastic strips but also foils as well as, for example, fabrics, textiles, or leather can be used for the cover. Combinations of the materials mentioned above are also feasible.

According to another advantageous feature of the present invention, the cover is preferably arranged as a sliding layer between the first part of the hook-and-loop fastening and the second part of the hook-and-loop fastening. The two parts of the hook-and-loop fastening, which adhere to each other on direct contact, are thus isolated from each other and can move relative to each other. Arranging the first part of the hook-and-loop fastening on the belt, therefore, makes it possible for the airbag unit and the belt to be relocated easily with respect to each other.

According to another advantageous feature of the present invention, the airbag unit comprises at least one flap arranged on it, wherein the flap extends around at least part of the periphery of the belt.

The flap serves as a movable connection between the airbag unit and the belt. To accomplish this, the flap wraps around the belt and thus makes it possible for the airbag unit and the belt to be relocated relative to each other. The flap can also designed in the form of a tunnel for this purpose, in which case it can extend over the entire length of the airbag unit.

It is also possible in this way to construct a closed system, which can be guided over the entire length of the belt, and which is also protected from the intrusion of foreign bodies.

According to another advantageous feature of the present invention, an especially compact design can be achieved by providing the airbag unit with a gas generator. The complicated task of installing a gas supply line proceeding from an external gas source is thus eliminated.

The gas generator integrated into the airbag unit is in working connection with an accident-detecting sensor system. When the sensor system is triggered, a control signal is produced. A control unit then activates the gas generator, as a result of which the gas is conducted into the airbag through an appropriately designed gas-conducting connection. The sensor system required for this purpose is connected directly or indirectly to the gas generator by a signal line.

There are in principle, however, other possible ways of transmitting the signal for deploying the airbag, such as optical or wireless connections. In general, for the sake of an especially compact design, the necessary sensor system can also be integrated directly into the airbag unit.

According to another advantageous feature of the present invention, the airbag is located near the neck of the occupant. Because of its individually adjustable proximity to the head area, the restraint system described here provides the head with especially effective protection. Especially when deployed on four-point or five-point belts, the airbag unit can have a shape which extends around the back and side areas of the neck, which guarantees, for example, that the head will be supported on three sides.

According to another advantageous feature of the present invention, in a variant of the restraint system the airbag unit is connected to the seat. When the airbag is arranged near the occupant's neck, the airbag unit will be connected to the seat by way of the seat back.

According to another advantageous feature of the present invention, the airbag unit is connected to the headrest of the seat, and the headrest comprises a gas generator. As a result, a very compact design is obtained, which allows the rapid and easy replacement of the airbag unit. A deployed airbag unit can therefore be replaced in a very short time simply by replacing the headrest equipped in this way. Even vehicles without an airbag unit can be retrofitted simply by replacing the headrest.

According to another advantageous feature of the present invention, the headrest comprises an impact airbag. The particular advantage here is attributable to the combined effect of the impact airbag and the airbag unit. In cases where both the airbag unit and the impact airbag are deployed, the head area of the occupant will be almost completely enclosed and thus protected. The severity of accident scenarios in which the energy of the impact causes the vehicle to accelerate forward and the head to snap backward can be minimized with the help of the impact airbag. The typical forward acceleration of the head after a front-end collision, followed by the backward acceleration of the head, is also reduced by the airbag unit in combination with the impact airbag.

In conjunction with a belt retractor or possibly a manual length adjuster, the belt can be adjusted in the lengthwise direction with respect to the airbag unit.

According to the present invention, a restraint system for occupants of a vehicle is created, which, in spite of the fact that it can be adjusted by relocating its components with respect to each other, ensures that deploying airbag will be secured in its proper location as required for safety. It thus offers a maximum of comfort and safety, and at the same time it can be adjusted individually to each occupant of the vehicle.

Thanks to the position-securing means, which hold the airbag securely in place, even an unexpected foreign body in the area into which the airbag expands and with which the inflated airbag could collide cannot shift the airbag out of position at the moment of its deployment.

In this connection, we can also see the advantages of the invention over an airbag system which is installed directly in the structure of the vehicle and which, when deployed, can be ineffective or even hazardous in some cases if the occupant is in an unexpected position or has assumed an unexpected posture. In addition, proper selection of the individual components guarantees maintenance-free operation without the problems associated with aging.

Because the restraint system described here functions independently of the form and function of the interior of the vehicle surrounding the seat, the occupants of any type of vehicle can be protected. With the system presented here, it is also possible to equip all of the seats in vehicles for transporting passengers such as busses, trains, and airplanes. If belts are already present, these can be easily retrofitted. It is also possible in particular to protect the occupants of aircraft, such as the pilots, in a simple and effective manner.

BRIEF DESCRIPTION OF THE DRAWINGS

It will become even easier to understand other features and advantages of the present invention by reading the following description of a currently preferred embodiment of the invention, which is explained by way of example with reference to the accompanying drawing.

DETAILED DESCRIPTION OF A PREFERRED EMBODIMENT

Figure 1:
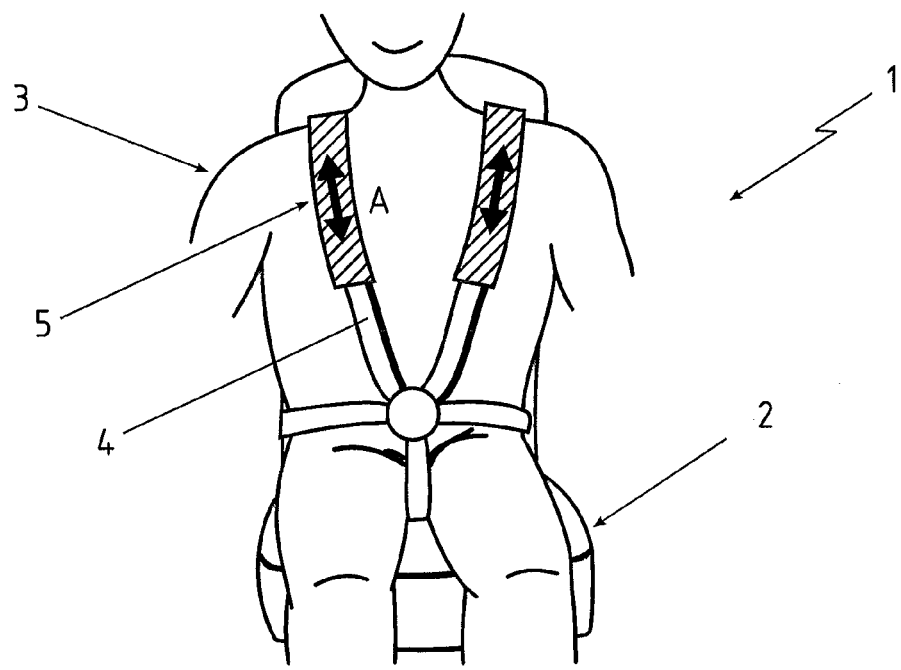
FIG. 1 shows a view of an occupant secured with an inventive restraint system.

In the drawings, FIG. 1 in particular shows an inventive restraint system 1, which is installed in a vehicle (not shown), and which holds an occupant securely in a seat 2. For this purpose, the restraint system 1 comprises a belt 4, which is designed here as a five-point belt. It extends over the shoulders of the occupant 3 on both sides and also across the hips. All of the partial sections of the belt 4, including a partial section of the belt 4 arranged between the legs, come together in the area of the abdomen of the occupant 3, where they are fastened together in a detachable manner. The opposite ends of the various partial sections of the belt 4 are connected to the seat 2 or directly to the structure of the vehicle by means not shown.

On each section of the belt 4 located in the area of the shoulders of the occupant 3, there is an airbag unit 5 positioned near the neck of the occupant 3. The belt 4 and the airbag unit 5 are designed so that they can be relocated relative to each other, wherein the airbag unit 5 can be shifted relative to the belt 4 in the belt's longitudinal direction.

Figure 2:
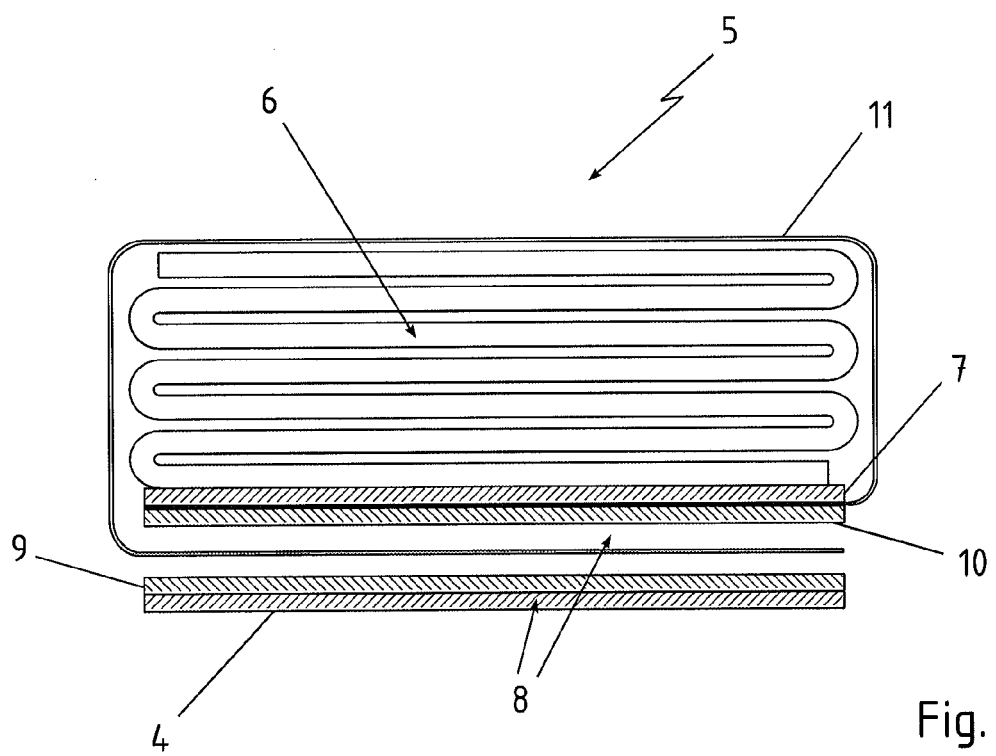
FIG. 2 shows a cross-sectional diagram of an airbag unit with a folded airbag.

FIG. 2, furthermore, shows a view into the airbag unit 5. The cross-sectional diagram shows that the airbag unit 5 comprises an airbag 6, which is folded over onto itself several times. The flat surface of the outer fold layer of the airbag 6 is connected a to the carrier belt 7. The belt 4 is parallel to the carrier belt 7 and extends along the side of the carrier belt which faces away from flat connection between the airbag 6 and the carrier belt 7. The position-securing means 8 for the airbag 6 are arranged between the belt 4 and carrier belt 7.

The position-securing means 8 are designed on the principle of a hook-and-loop fastening, wherein a first part of the hook-and-loop fastening 9 is arranged flat on the belt 4, and the second part of the hook-and-loop fastening 10 is arranged, also flat, on the side of the carrier belt 7 facing away from the airbag 6. On a wide side of the airbag unit 5, a cover 11 is positioned between the carrier belt 7 and the second part 10 of the hook-and-loop fastening and is attached to them. The cover 11 extends around the folded airbag 6 transversely to the longitudinal direction of the airbag unit 5 and thus covers its wide [Sic→narrow—JPD] sides and also the side [i.e., the other wide side—JPD] of the folded airbag 6 facing away from the carrier belt 7. After wrapping around the folded airbag 6, the free end of the cover 11 extends across the entire width of the first and second parts 9, 10 of the hook-and-loop fastening and thus covers each of these also.

Because the cover 11 extends between the first and second parts 9, 10 of the hook-and-loop fastening, the position-securing means 8 for the airbag 6 are isolated from each other on the belt 4. The cover 11 serves here as a sliding layer between the first and second parts 9, 10 of the hook-and-loop fastening.

Figure 3:
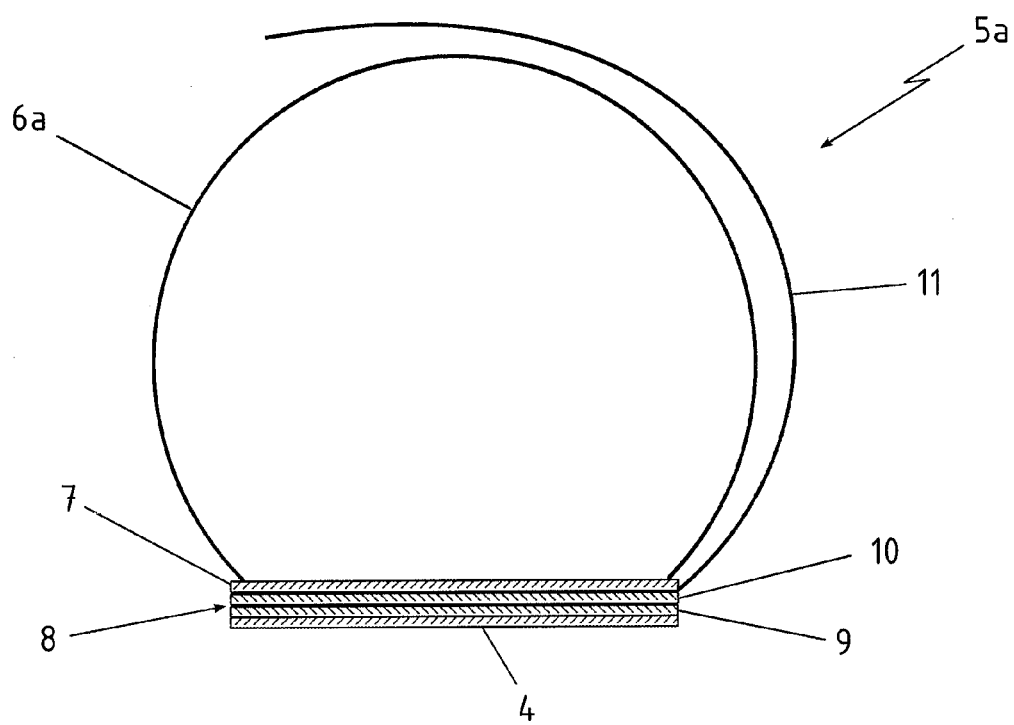
FIG. 3 shows a diagram of an airbag unit similar to FIG. 2 except that here the airbag is in the expanded state.

FIG. 3, furthermore, shows a deployed airbag unit 5a, where the volume of the expanded airbag 6a has increased significantly in comparison to the airbag in the folded state shown in FIG. 2. The cover 11 has been pulled out of its position between the first and second parts 9, 10 of the hook-and-loop fastening. The two sections of the hook-and-loop fastening 9, 10 interlock and thus become positively connected to each other.

Figure 4:
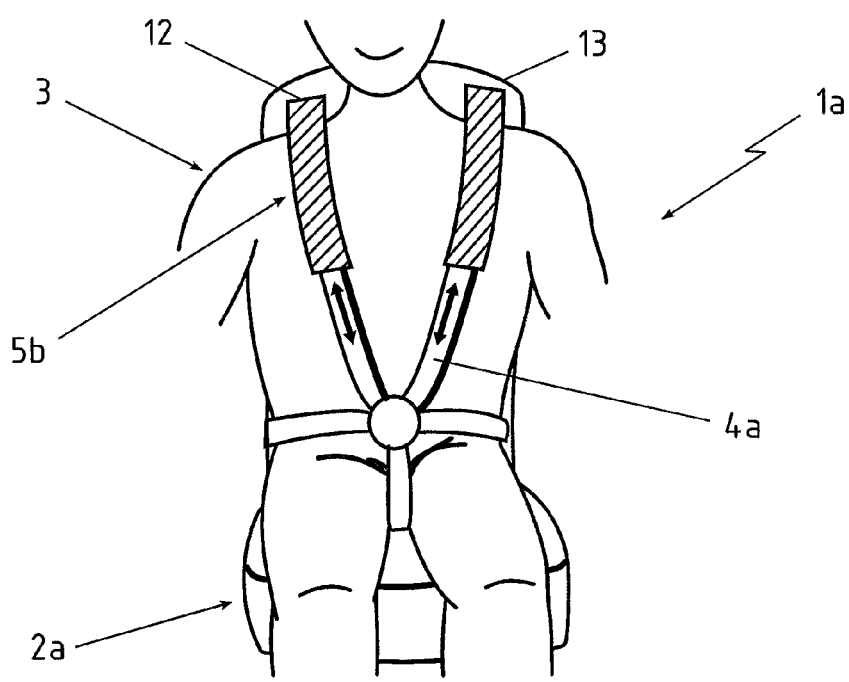
FIG. 4 is a diagram similar to FIG. 1 showing a variant of the restraint system.

FIG. 4, furthermore, shows a restraint system 1a, which represents a variant of the restraint system 1 previously described in conjunction with FIG. 1. The restraint system 1a comprises here a five-point belt design similar to that of the belt in FIG. 1, comprising an airbag unit 5b in each of its two shoulder sections, near the neck of the occupant 3. The end 12 of each airbag unit 5b passing over the shoulder of the occupant 3 is connected to the back 13 of a seat 2a. The belt 4a passes through the interior of the airbag unit 5b and is able to move in the longitudinal direction B.

Figure 5:
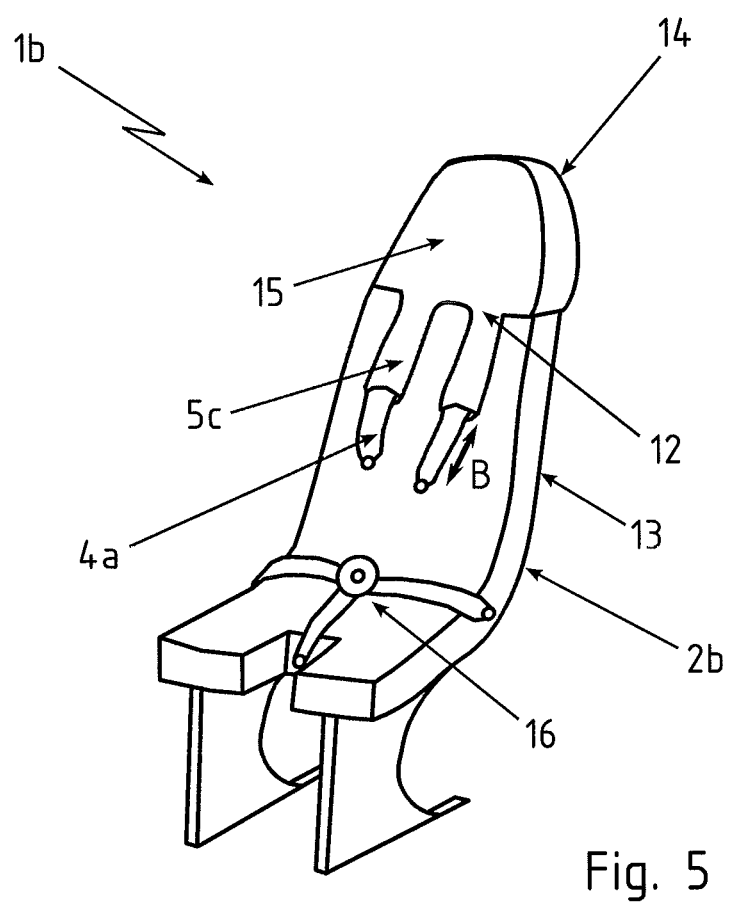
FIG. 5 shows a perspective view of a variant of the restraint system.

FIG. 5, furthermore, shows a perspective view of a variant 1b of the restraint system. The restraint system 1b also comprises a five-point belt design similar to that of the belts 4 and 4a in FIGS. 1 and 4, comprising an airbag unit 5c in each of the shoulder sections located near the neck of the occupant 3 (not shown here). Each airbag unit 5c is connected by its end 12, which lies across the shoulder of the occupant 3 (not shown), to a headrest 14 of a seat 2b. In analogy to FIG. 4, the belt 4a also passes here through the interior of the airbag unit 5c and can be moved in the longitudinal direction B. A gas generator (not shown) is installed inside the headrest 14. The headrest 14, furthermore, comprises, on the side facing the head (not shown) of the occupant 3, an impact airbag 15, which can be deployed either together with the airbag 5c or separately from the airbag unit 5c. The hip belt area 16 and the belt 4a in combination with belt retractors (not shown) correspond to the typical design of a belt system for a seat 2b of this type.

In practice, an inventive restraint system 1, 1a, 1b is combined with a seat 2, 2a or with the headrest 14 of the seat 2b inside the vehicle. The seat 2, 2a, 2b is occupied by an occupant 3, who puts on the belt 4, 4a of the restraint system 1, 1a, 1b, which comprises an airbag unit 5, 5a-5c in the area of each of the shoulders of the occupant 3. An accident situation critical to the occupant 3 of the vehicle is detected by an appropriate sensor system, which registers the deceleration values which occur and, if a previously set threshold value is exceeded, triggers a gas generator.

The gas generator is connected to the folded airbag 6 arranged inside the airbag unit 5, 5b by an appropriate gas-carrying line. The gas pressure generated by the gas generator is conducted into the folded airbag 6 through the gas line, whereupon the bag expands very quickly. A cover 11, which is arranged around the airbag 6 and which is attached to the airbag unit 5, 5a, 5b, is pulled out of its original position. The wrapped circumference of the deployed airbag 6 increases, and this expansion of the bag has the effect of displacing the part of the cover 11 extending around it.

A free end of the cover 11, which passes between a first part 9 of a hook-and-loop fastening and a second part 10 of a hook-and-loop fastening and thus covers them, is pulled out of this position by the expansion of the airbag 6. As a result, the position-securing means 8 consisting of the first and second parts 9, 10 of the hook-and-loop fastening enter into two-dimensional contact with each other. The body of the occupant 3, which is being flung forward by the rapid deceleration of the vehicle, is thus accelerated in the direction opposite the force exerted by the expanding airbag 6a, whereupon the two sections of the position-securing means 8 become positively connected to each other. The closed hook-and-loop fastening thus produced holds the belt 4, 4a and the airbag unit 5a, 5b exactly in their intended positions with respect to each other, which are now held together without the possibility of displacement in the longitudinal direction A, B.

If the airbag unit 5c is combined with the headrest 14 and the impact airbag 15 contained therein, the airbag unit 5c and the impact airbag 15 can be deployed either simultaneously or in succession. The airbag unit 5c and the impact airbag 15 are expanded in this case either by only one gas generator or by separate gas generators operating independently of each other. It is advantageous in the case of a front-end collision of the vehicle, for example, for the airbag unit 5c to be deployed first to cushion the deflected head of the occupant 3. The impact airbag 15 is deployed second to cushion the head of the occupant 3 as it is being flung backward.

Whereas the invention has been explained and described in conjunction with a currently preferred embodiment, which has been both illustrated and explained in detail, it should not be limited to the details shown, because it is possible to make various modifications and structural changes without departing from the inventive idea or from the scope of the present invention. The embodiment was selected and described as a way of explaining the principles of the invention, thus enabling a person knowledgeable in this area to make the best possible use of the invention and its various forms by designing suitable embodiments and adapting them to specific sets of requirements.

What is claimed and novel and for which patent protection is desired is presented in the attached claims and contains equivalents to the elements presented therein.

The invention claimed is:

1. A restraint system for occupants of a vehicle, comprising:
   a belt;
   an airbag unit, which is arranged on the belt, wherein the positions of the belt and the airbag unit can be shifted with respect to each other;
   an airbag on the airbag unit; and
   means for securing the position of the airbag on the belt, by which the airbag can be fastened securely to the belt in response to deployment of the airbag;
   the securing means having a first condition, prior to the airbag being deployed, in which the airbag can be shifted with respect to the belt;
   the securing means moving from the first condition to a second condition, in response to deployment of the airbag, after the airbag is deployed the securing means when in the second condition fastening the airbag securely to the belt to prevent shifting of the airbag with respect to the belt.

2. The restraint system according to claim 1, wherein the position-securing means are surrounded by a cover.

3. The restraint system according to claim 2, wherein the cover is attached to the airbag unit and can be moved out of position by the deploying airbag.

4. The restraint system according to claim 2, wherein the undeployed airbag is at least partially surrounded by the cover.

5. The restraint system according to claim 1, wherein the airbag unit comprises a flap, and at least part of the belt is arranged to pass through the flap.

6. The restraint system according to claim 1, wherein the airbag unit comprises a gas generator.

7. The restraint system according to claim 1, wherein the airbag is arranged near the occupant's neck.

8. The restraint system according to claim 1, wherein the airbag unit is attached to a seat.

9. A restraint system for an occupant of a vehicle, comprising:
   a belt;
   an airbag unit supported on the belt for movement along the belt;
   an airbag on the airbag unit; and
   a fastener having a first condition in which the airbag unit is movable along the belt and having a second condition, responsive to inflation of the airbag, in which the airbag unit is fixed in position along the belt.

10. A restraint system as set forth in claim 9 wherein the fastener includes a first fastener portion on the belt and a second fastener portion on the airbag unit that is selectively engageable with the first fastener portion, and wherein the inflation of the airbag enables the first and second fastener portions to move into engagement with each other thereby to fix the airbag unit in position along the belt.

11. A restraint system as set forth in claim 10 wherein the airbag unit includes a separator that is disposed between the first and second fastener portions when the fastener is in the first condition and that blocks engagement of the first and second fastener portions when the fastener is in the first condition, and wherein the inflation of the airbag causes the separator to be moved out from between the first and second fastener portions thereby enabling the first and second fastener portions to move into engagement with each other thereby to fix the airbag unit in position along the belt.

12. A restraint system as set forth in claim 11 wherein the separator is a portion of a cover for the airbag and wherein the fastener is a hook and loop fastener.

13. A restraint system as set forth in claim 9 wherein the first and second fastener portions are moved into engagement with each other under the force of the inflation of the airbag and the force of movement of the occupant being restrained.

14. A restraint system for occupants of a vehicle, comprising:
   a belt;
   an airbag unit, which is arranged on the belt, wherein the positions of the belt and the airbag unit can be shifted with respect to each other;
   an airbag on the airbag unit; and
   means for securing the position of the airbag on the belt, by which the airbag can be fastened securely to the belt when the airbag is deployed;
   wherein the position-securing means are designed on the principle of a hook-and-loop fastening, wherein the first part of the hook-and-loop fastening is arranged on the belt and the second part of the hook-and-loop fastening is arranged on the airbag unit.

15. The restraint system according to claim 14, wherein the cover is arranged as a sliding layer between the first part of the hook-and-loop fastening and the second part of the hook-and-loop fastening.

16. A restraint system for occupants of a vehicle, comprising:
   a belt;
   an airbag unit, which is arranged on the belt, wherein the positions of the belt and the airbag unit can be shifted with respect to each other;
   an airbag on the airbag unit; and
   means for securing the position of the airbag on the belt, by which the airbag can be fastened securely to the belt when the airbag is deployed;
   wherein the airbag unit is attached to a seat; and
   wherein the airbag unit is attached to a headrest of the seat and the headrest comprises a gas generator.

17. The restraint system according to claim 16, wherein the head rest comprises an impact airbag.

* * * * *